(12) United States Patent
Schacht et al.

(10) Patent No.: US 12,092,194 B1
(45) Date of Patent: Sep. 17, 2024

(54) SYSTEMS AND METHOD FOR AN ELECTRIC POWERTRAIN

(71) Applicant: Dana Belgium N.V., Flanders (BE)

(72) Inventors: Filip D. Schacht, Meulebeke (BE); Wieguo Zhao, Wuxi (CN)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/459,851

(22) Filed: Sep. 1, 2023

(51) Int. Cl.
| | | |
|---|---|---|
| *B60K 1/02* | (2006.01) | |
| *B60K 17/08* | (2006.01) | |
| *B60K 17/16* | (2006.01) | |
| *F16H 37/08* | (2006.01) | |
| *F16H 61/68* | (2006.01) | |
| *B60K 17/344* | (2006.01) | |
| *B60K 17/356* | (2006.01) | |

(52) U.S. Cl.
CPC .......... *F16H 37/0806* (2013.01); *B60K 1/02* (2013.01); *B60K 17/08* (2013.01); *B60K 17/165* (2013.01); *F16H 61/68* (2013.01); *B60K 17/344* (2013.01); *B60K 17/356* (2013.01); *F16H 2200/0021* (2013.01); *F16H 2200/0034* (2013.01); *F16H 2200/2005* (2013.01); *F16H 2200/2035* (2013.01)

(58) Field of Classification Search
CPC .................. F16H 37/0806; F16H 61/68; F16H 2200/0021; F16H 2200/0034; F16H 2200/2005; F16H 2200/2035; B60K 1/02; B60K 17/08; B60K 17/165; B60K 17/344; B60K 17/356
See application file for complete search history.

(56) References Cited

U.S. PATENT DOCUMENTS

| | | | |
|---|---|---|---|
| 9,604,529 | B2 | 3/2017 | Choi |
| 9,707,834 | B2 | 7/2017 | Lee et al. |
| 2020/0116237 | A1 | 4/2020 | Chae et al. |

FOREIGN PATENT DOCUMENTS

| | | | | |
|---|---|---|---|---|
| CN | 110962570 | A | * 4/2020 | ............... B60K 6/24 |
| CN | 111332113 | A | 6/2020 | |
| CN | 111750049 | A | 10/2020 | |
| CN | 112519560 | A | * 3/2021 | |
| CN | 112693306 | A | 4/2021 | |
| CN | 215850724 | U | * 2/2022 | |
| CN | 114635950 | A | 6/2022 | |
| WO | 2019159031 | A1 | 8/2019 | |

\* cited by examiner

*Primary Examiner* — Justin Holmes
(74) *Attorney, Agent, or Firm* — McCoy Russell LLP

(57) ABSTRACT

Systems and a method are provided for a transmission system. In one example, a system includes a first input shaft coupled to a first prime mover and a first motor gear, a second input shaft coupled to a second prime mover and a second motor gear, a planet carrier coupled to a planetary shaft engaged to a first clutch via a planetary gear and a first clutch gear or to a second clutch shaft of a second clutch on which a second clutch gear is arranged, and an output shaft, wherein the first clutch gear is arranged on the output shaft, further comprising an output shaft gear arranged on the output shaft and meshed with the second clutch gear.

20 Claims, 4 Drawing Sheets

US 12,092,194 B1

SYSTEMS AND METHOD FOR AN ELECTRIC POWERTRAIN

TECHNICAL FIELD

The present description relates generally to a decoupling device of a transmission of an electric powertrain.

BACKGROUND AND SUMMARY

As the proliferation of vehicle electrification continues, changes to vehicle components are demand to accommodate new vehicle architectures. For example, transmissions designed for use with internal combustion engines may experience reduced performance and/or reduced longevity when coupled to an electric motor. Electric motors may operate at higher speeds than engines, which may result in increased stress across one or more components of the transmission. This increased stress may also present undesired conditions for vehicle occupants, such as noise, vibration, and harshness (NVH).

Thus, a demand for a transmission that is configured to operate efficiently with an electric motor is desired. In one example, the issues described above may be addressed by a system including a first input shaft coupled to a first prime mover and a first motor gear, a second input shaft coupled to a second prime mover and a second motor gear, a planet carrier coupled to a planetary shaft engaged to a first clutch via a planetary gear and a first clutch gear or to a second clutch shaft of a second clutch on which a second clutch gear is arranged, and an output shaft, wherein the first clutch gear is arranged on the output shaft, further comprising an output shaft gear arranged on the output shaft and meshed with the second clutch gear.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the present disclosure, will become readily apparent to those skilled in the art from the following detailed description when considered in light of the accompanying drawings in which.

DETAILED DESCRIPTION

Figure 1:
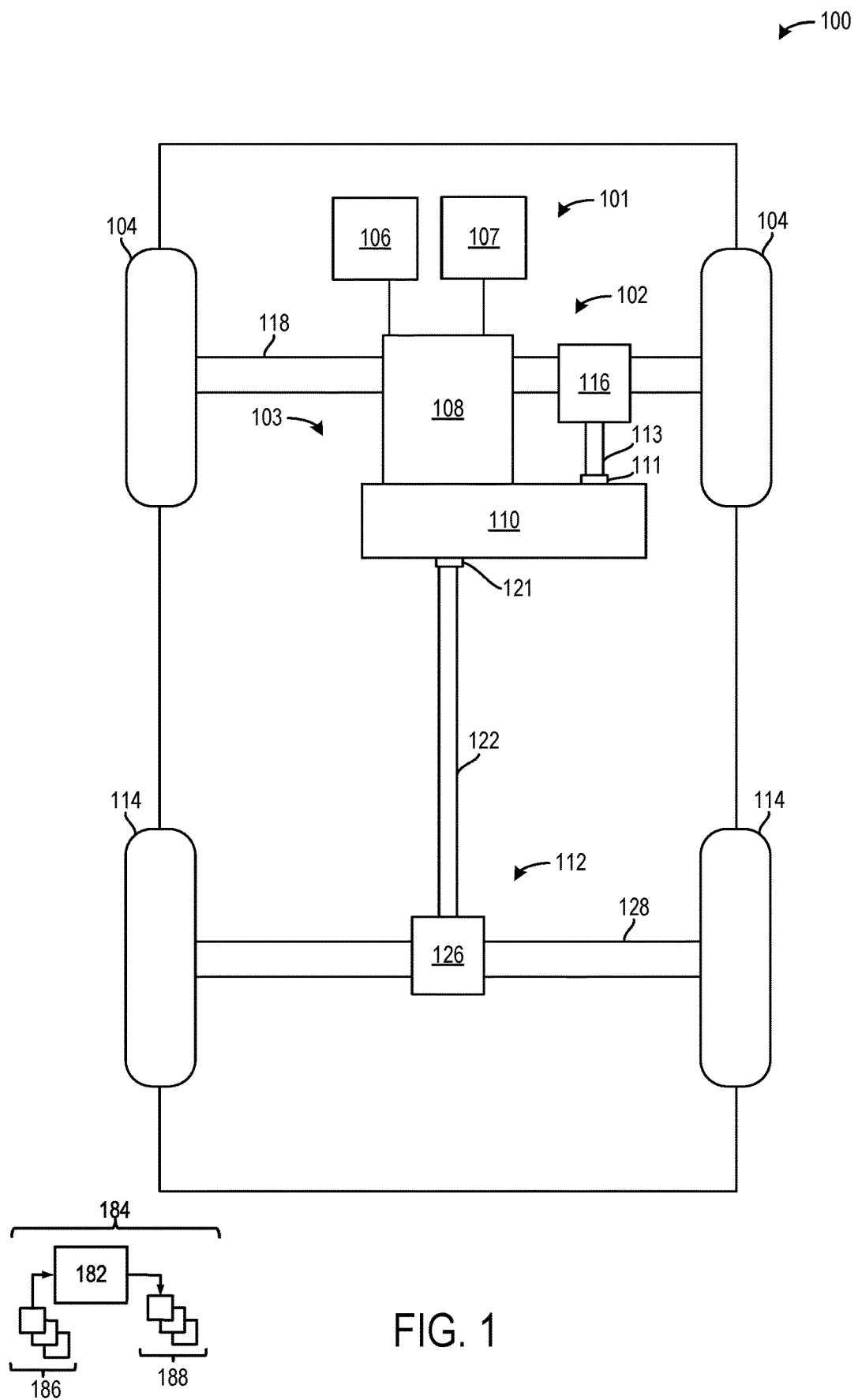
FIG. 1 is a schematic depiction of an example vehicle powertrain, according to an embodiment of the present disclosure.
Figure 2:
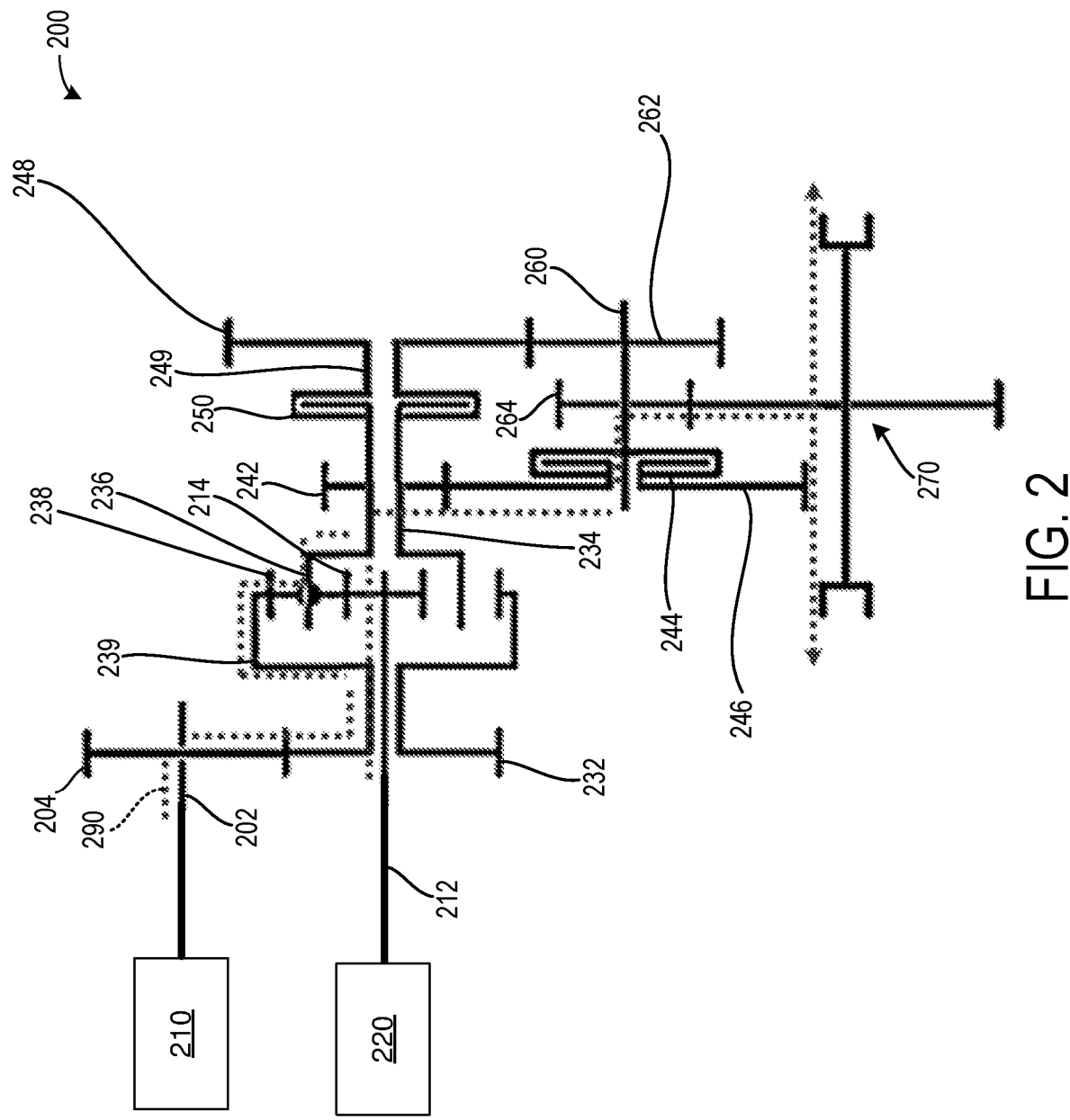
FIG. 2 is a first embodiment of a transmission of the vehicle powertrain, according to an embodiment of the present disclosure.
Figure 3:
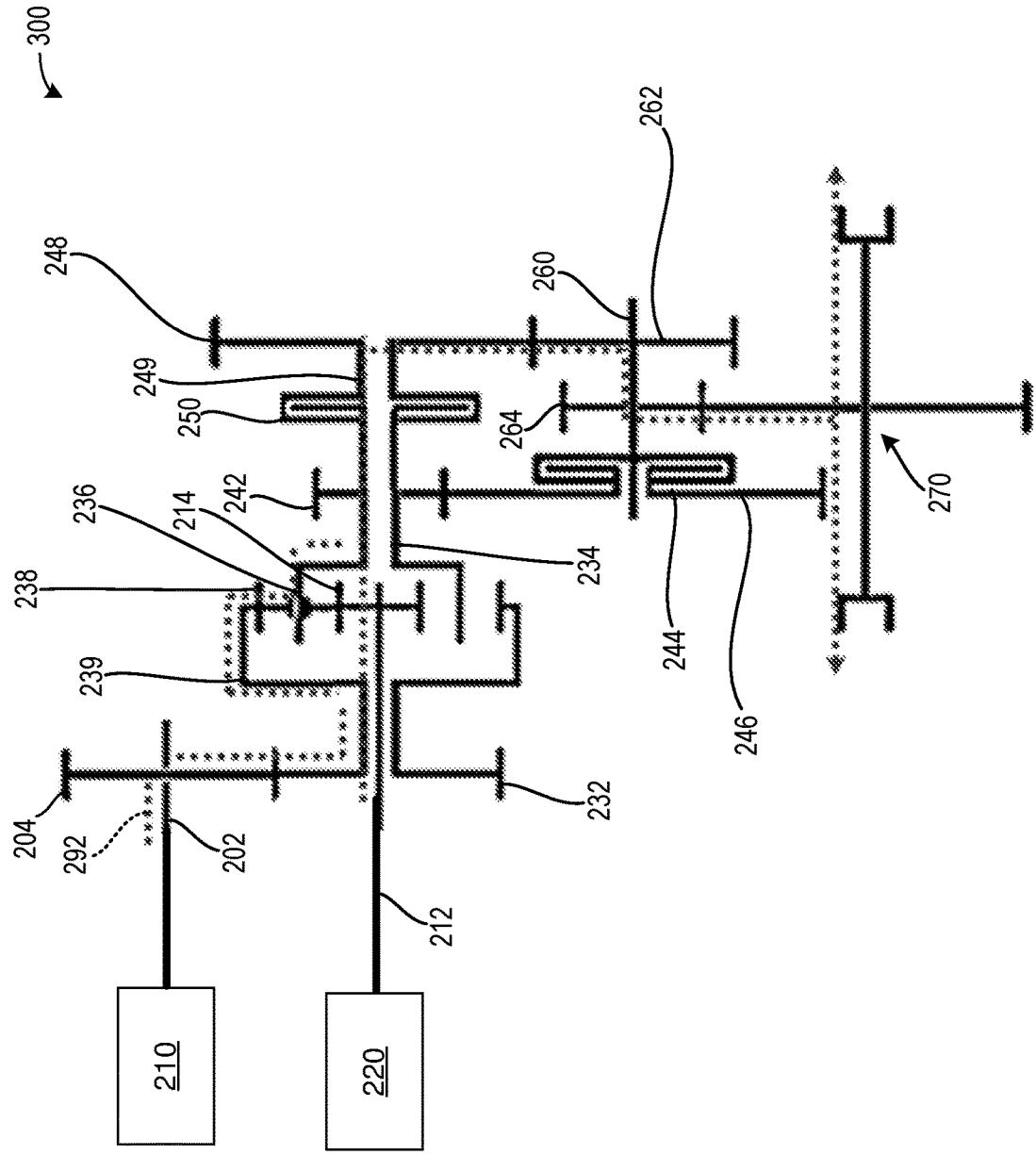
FIG. 3 is a second embodiment of a transmission of the vehicle powertrain, according to an embodiment of the present disclosure.
Figure 4:
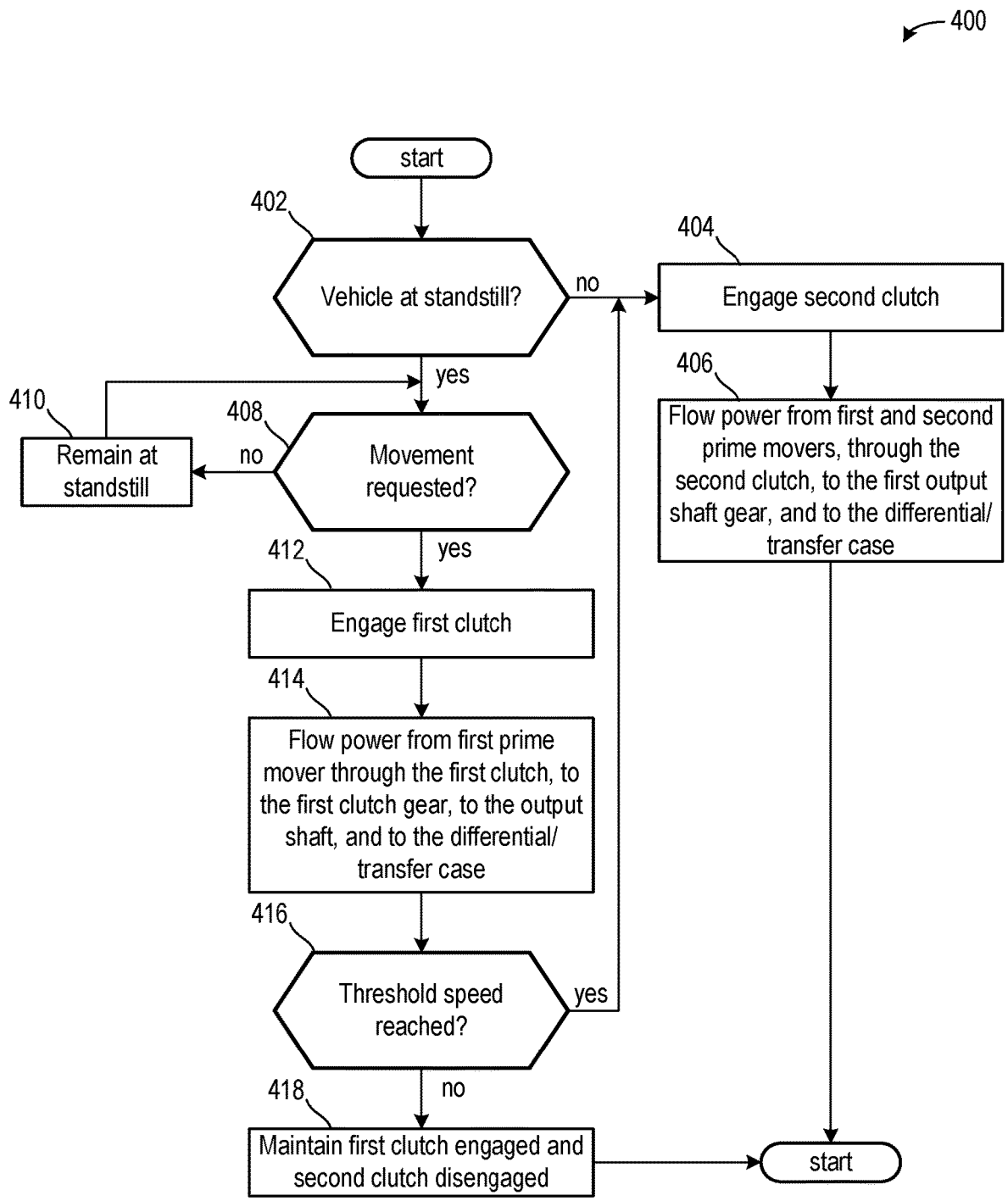
FIG. 4 is a method for operating one or more clutches of the transmission based on operation of one or more prime movers coupled to the transmission, according to an embodiment of the present disclosure.

The following description relates to a transmission. In one example, the transmission is a two-speed transmission coupled to separate prime movers of a powertrain of a vehicle, as shown in FIG. 1. FIG. 2 illustrates a first operation of the transmission. FIG. 3 illustrates a second operation of the transmission. FIG. 4 shows a method for operating one or more clutches of the transmission based on operation of one or more prime movers coupled to the transmission.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, a vehicle 100 is shown comprising a powertrain 101 and a drivetrain 103. The powertrain comprises a prime mover 106 and a transmission 108. The prime mover 106 may be an internal combustion engine or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting.

In one example, the prime mover 106 is a first prime mover 106 and the vehicle 100 may further include a second prime mover 107. The first prime mover 106 may be different than the second prime mover 107. For example, the first prime mover 106 may be an electric machine and the second prime mover 107 may be an internal combustion engine. Additionally or alternatively, the first prime mover 106 and the second prime mover 107 may both be an electric motor or an internal combustion engine, however, a size and/or fuel source thereof may be different between the first and second prime movers 106, 107. In some examples, additionally or alternatively, if one of the first prime mover 106 or the second prime mover 107 is an engine, the engine may be configured to combust multiple fuels including varying amounts of carbon and carbon-free fuels. In one example, the vehicle 100 comprises at least the first prime mover 106 and the second prime mover 107, wherein each of the prime movers deliver torque and/or power to a gearing system (e.g., transmission 108).

Each of the first prime mover 106 and the second prime mover 107 may be coupled to an energy storage device. The energy storage device may be a battery, a fuel tank, or other similar device. A charge of fuel volume of the energy storage device may be monitored via a sensor or estimated based on vehicle operating conditions. In one example, one or more of the first prime mover 106 and the second prime mover 107 may be configured to replenish a charge of the energy storage device during a generator operation.

The vehicle 100 may be a heavy duty vehicle or an off-highway vehicle. Additionally or alternatively, the vehicle 100 and/or one or more of its components may be in industrial, locomotive, and agricultural applications.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing.

The vehicle 100 may further include a control system 184. Control system 184 is shown comprising a controller 182 receiving information from a plurality of sensors 186 and sending control signals to a plurality of actuators 188. The controller 182 may receive input data from the various sensors, process the input data, and trigger the actuators in response to the processed input data based on instruction or code programmed therein corresponding to one or more routines. The plurality of sensors 186 may include speed sensors, temperature sensors, humidity sensors, location sensors, accelerometers, and the like. The plurality of actuators 188 may be actuators of one more valves, motors, and other devices.

Turning now to FIG. 2, it shows a transmission assembly 200. The transmission assembly 200 may be included in vehicle 100 of FIG. 1. In one example, the transmission assembly 200 is a non-limiting example of the transmission 108 of FIG. 1. The transmission assembly 200 may be a multi-speed transmission. In one example, the transmission assembly 200 is a two-speed transmission.

The transmission assembly 200 may include a first input shaft 202. The first input shaft 202 may transfer power from a first prime mover 210 to a first motor gear 204. In one example, the first prime mover 210 is an electric machine. The first prime mover 210 may be a non-limiting example of the first prime mover 106 of FIG. 1.

The transmission assembly 200 may further include a second input shaft 212. The second input shaft 212 may transfer power from a second prime mover 220 to a second motor gear 214. In one example, the second prime mover 220 is an electric machine. Additionally or alternatively, the second prime mover 220 may be an internal combustion engine. The second prime mover 220 may be a non-limiting example of the second prime mover 107 of FIG. 1.

In some examples, additionally or alternatively, one or more of the first prime mover 210 and the second prime mover 220 may be configured as a motor/generator configured to propel the vehicle during a motor mode and replenish a charge of an energy storage device during a generating mode. Additionally or alternatively, one or more components may be powered during the generating mode.

The first motor gear 204 and the second motor gear 214 may be coupled to different portions of a planetary gear set. The first motor gear 204 may be in a meshed engagement with a first gear 232. The meshed engagement may include where teeth of a gear intersect with teeth of another gear, such that rotation of the gear results in rotation of the another gear.

The first gear 232 may be coupled to a first planetary gear 238 via a flange 239. The first planetary gear 238 is a ring gear of a planetary gear system. The second motor gear 214 may be coupled to a planetary carrier 236. In one example, the second motor gear 214 is a sun gear. The planetary carrier 236 may be arranged on a planetary shaft 234. The planetary carrier 236 carries the planet gears which are connected to the second motor gear 214 and the first planetary gear 238. As such, the planetary carrier 236 may be configured to transfer power from each of the first prime mover 210 and the second prime mover 220 to the planetary shaft 234.

A second gear 242 may be meshed to a first clutch gear 246 of a first clutch 244. The planetary shaft 234 may be directly coupled to a second clutch 250. In one example, the first clutch 244 and the second clutch 250 may be identical clutches, such as a wet clutch. Additionally or alternatively, the first clutch 244 and the second clutch 250 may be different types of clutches without departing from the scope of the present disclosure.

The first clutch 244 may control output from the first clutch gear 246 to an output shaft 260. The second clutch 250 may control output from a second clutch gear 248 to a first layshaft gear 262 arranged on the layshaft 260. In one example, the second clutch gear 248 is in meshed engagement with the first layshaft gear 262. The second clutch gear 248 may be arranged on a second clutch shaft 249 that may be engaged with the planetary shaft 234 when the second clutch 250 is engaged.

When the layshaft 260 rotates due to power transferred from the planetary gear system through the first clutch 244 or the second clutch 250, a second layshaft gear 264 may rotate and transfer power to a front and/or rear axle. In some examples, additionally or alternatively, the second layshaft gear 264 may be coupled to a power transfer case configured to transfer power to each of the front and rear axles.

In some examples, additionally or alternatively, the second layshaft gear 264 may be omitted and the layshaft 260 may output directly to a single axle of the vehicle.

Dotted lines 290 and 292 illustrate a direction of power through the transmission assembly 200 of FIGS. 2 and 3, respectively. A first mode of operation is illustrated in FIG. 2. A second mode of operation is illustrated in FIG. 3.

During the first mode of operation, the second clutch is disengaged and the first clutch is engaged. When the second clutch is disengaged, rotation, and therefor power, is not transferred from the planetary shaft 234 to the second clutch shaft 249. Power from each of the first prime mover 210 and the second prime mover 220 is transferred from the planetary shaft 234, through the first clutch gear 246, through the layshaft 260, and to the front and/or rear axle. In this way, during the first mode, power does not flow through any of the second clutch 250, the second clutch shaft 249, the second clutch gear 248, and the first layshaft gear 262.

FIG. 3 shows a direction of power flow via dotted lines 292 during the second mode of operation. During the second mode of operation, the first clutch 244 is disengaged and the second clutch 250 is engaged. When the first clutch 244 is disengaged, rotation of the first clutch gear 246 is not transferred to the output shaft 260. As such, power from the first clutch gear 246 is not transferred to the output shaft 260. Power flows from the first prime mover 210 and the second prime mover 220 to the planetary shaft 234, through the second clutch shaft 249 via an engaged second clutch 250. The second clutch shaft 249 spins the second clutch gear 248 which is in meshed engagement with the first output shaft gear 262. The first output shaft gear 262 spins the output shaft 260 on which the second output shaft gear 264 is arranged. The second output shaft gear 264 may transfer power to the differential 270.

Turning now to FIG. 4, it shows a method 400 for activating and deactivating clutches of a multi-speed transmission in response to operating conditions of one or more prime movers of a vehicle. Instructions for carrying out method 400 may be executed by a controller based on instructions stored on a memory of the controller and in conjunction with signals received from sensors of the vehicle system, such as the vehicle system described above with reference to FIG. 1. The controller may employ actuators of the vehicle system to adjust operation, according to the method described below.

The method 400 begins at 402, which includes determining if the vehicle is at a standstill. The vehicle may be at a standstill if one or more of a vehicle speed is zero, a brake pedal is depressed, and an accelerator pedal is released. If the vehicle is not at a standstill, then at 404, the method 400 may include engaging the second clutch. In one example, when the second clutch is engaged, the first clutch is disengaged.

At 406, the method 400 may include flowing power from the first and second prime movers, through the second clutch, to the first output shaft gear, and to the differential and/or to a transfer case.

Returning to 402, if the vehicle is at a standstill, then at 408, the method 400 may include determining if movement is requested. Movement may be requested if the brake pedal is released and/or if the accelerator pedal is depressed.

If movement is not requested, then at 410, the method 400 may include maintaining the vehicle at standstill. As such, power from the prime movers is not transferred through the transmission assembly and to wheels of the vehicle.

If movement is requested, then at 412, the method 400 may include engaging the first clutch. When the first clutch is engaged, the second clutch may be disengaged.

At 414, the method 400 may include flowing power from the first prime mover through the first clutch, which is engaged, to the first clutch gear, to the output shaft, and to the differential/transfer case. In one example, the second prime mover does not output power.

At 416, the method 400 may include determining if a threshold speed is reached. In one example, the threshold speed may be based on a speed at which a powertrain efficiency is increased by operating each of the first and second prime movers. Additionally or alternatively, the threshold speed may be based on a speed at which vibrations generated due to activation of the second prime mover is less than a determined value such that a vehicle occupant may not sense the vibration.

If the threshold speed is not reached, then at 418, the method 400 may include maintaining the first clutch engaged and the second clutch disengaged. Additionally or alternatively, only the first prime mover may output power to the transmission assembly.

The disclosure provides support for a multi-speed transmission including a first input shaft coupled to a first prime mover and a first motor gear, a second input shaft coupled to a second prime mover and a second motor gear, a planet carrier coupled to a planetary shaft engaged to a first clutch via a planetary gear and a first clutch gear or to a second clutch shaft of a second clutch on which a second clutch gear is arranged, and an output shaft, wherein the first clutch gear is arranged on the output shaft, further comprising an output shaft gear arranged on the output shaft and meshed with the second clutch gear. A first example of the transmission further includes where the first clutch is engaged when only the first prime mover is operated. A second example of the transmission, optionally including the first example, further includes where the second clutch is engaged when the first prime mover and the second prime mover are operated. A third example of the transmission, optionally including one or more of the previous examples, further includes where the first prime mover and the second prime mover are electric machines. A fourth example of the transmission, optionally including one or more of the previous examples, further includes where the multi-speed transmission is a two-speed transmission. A fifth example of the transmission, optionally including one or more of the previous examples, further includes where the output shaft outputs directly to a differential of a front axle or a rear axle.

The disclosure provides additional support for a system including a transmission system coupled to two motors via a first input shaft and a second input shaft, a planetary gear set comprising a plurality of gears, a carrier, and a planet shaft, and a pair of clutches configured to adjust power flow through the transmission system to different ends of an output shaft, wherein a first clutch transfers power from a gear of the planetary gear set to the output shaft and a second clutch transfers power from the planet shaft to an output shaft gear. A first example of the system further includes where a controller with instructions stored on memory thereof that when executed enable the controller to engage the first clutch and disengage the second clutch when moving a vehicle comprising the transmission system from a standstill, wherein the instructions further enable the controller to only operate a first motor coupled to the first input shaft. A second example of the system, optionally including the first example, further includes where the instructions further cause the controller to engage the second clutch and disengage the first clutch when the vehicle is moving at a threshold speed, wherein instructions further enable the controller to operate the first motor coupled to the first input shaft and a second motor coupled to the second input shaft. A third example of the system, optionally including one or more of the previous examples, further includes where the transmission system is a multi-speed transmission system. A fourth example of the system, optionally including one or more of the previous examples, further includes where the output shaft is the only output of the transmission system. A fourth example of the system, optionally including one or more of the previous examples, further includes where the pair of clutches are wet clutches. A fifth example of the system, optionally including one or more of the previous examples, further includes where the first clutch comprises a first clutch gear in a meshed coupling with the gear of the planetary gear set, and wherein the first clutch gear is arranged on the output shaft. A sixth example of the system, optionally including one or more of the previous examples, further includes where the second clutch comprises a second clutch gear arranged on a second clutch shaft, the second clutch shaft coupled directly to the planet shaft and the second clutch gear in a meshed coupling with the output shaft gear. A seventh example of the system, optionally including one or more of the previous examples, further includes where only one of the first clutch and the second clutch is engaged when power is transferred to the output shaft.

The disclosure provides further support for a method for operating clutches of a two-speed transmission including activating a first clutch of the two-speed transmission and flowing power from only a first motor to a planet shaft of a planetary gear set, to a planet gear, to a first clutch gear meshed with the planet gear, and to an output shaft on which the first clutch gear is arranged during a first operation and activating a second clutch of the two-speed transmission and deactivating the first clutch during a second operation, further comprising flowing power from each of the first motor and a second motor to the planet shaft of the planetary gear set, to a second clutch shaft coupled to the planet shaft, to a second clutch gear arranged on the second clutch shaft, and to an output shaft gear arranged on the output shaft. A first example of the method further includes where the first operation comprises actuating a vehicle comprising the two-speed transmission from a standstill. A second example of the method, optionally including the first example, further includes where the second operation comprises actuating a vehicle comprising the two-speed transmission at a threshold speed. A third example of the method, optionally including one or more of the previous examples, further includes where flowing power further comprises flowing power to a differential on an axle, wherein wheels are coupled to extreme ends of the axle. A fourth example of the method, optionally including one or more of the previous examples, further includes where the first motor is an electric machine.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A multi-speed transmission, comprising:
    a first input shaft coupled to a first prime mover and a first motor gear;
    a second input shaft coupled to a second prime mover and a second motor gear;
    a planet carrier coupled to a planetary shaft engaged to a first clutch via a planetary gear and a first clutch gear or to a second clutch shaft of a second clutch on which a second clutch gear is arranged;
    a second gear meshed to the first clutch gear of the first clutch, wherein the second gear is directly coupled to the second clutch; and
    an output shaft, wherein the first clutch gear is arranged on the output shaft, further comprising an output shaft gear arranged on the output shaft and meshed with the second clutch gear.

2. The multi-speed transmission of claim 1, wherein the first clutch is engaged when only the first prime mover is operated.

3. The multi-speed transmission of claim 1, wherein the second clutch is engaged when the first prime mover and the second prime mover are operated.

4. The multi-speed transmission of claim 1, wherein the first prime mover and the second prime mover are electric machines.

5. The multi-speed transmission of claim 1, wherein the multi-speed transmission is a two-speed transmission.

6. The multi-speed transmission of claim 1, wherein the output shaft outputs directly to a differential of a front axle or a rear axle.

7. A system, comprising:
    a transmission system coupled to two motors via a first input shaft and a second input shaft;
    a planetary gear set comprising a plurality of gears, a carrier, and a planet shaft;
    a pair of clutches configured to adjust power flow through the transmission system to different ends of an output shaft, wherein a first clutch transfers power from a gear of the planetary gear set to the output shaft and a second clutch transfers power from the planet shaft to an output shaft gear wherein the first clutch comprises a first clutch gear in a meshed coupling with the gear of the planetary gear set; and
    a second gear meshed to the first clutch gear of the first clutch, wherein the second gear is directly coupled to the second clutch.

8. The system of claim 7, further comprising a controller with instructions stored on memory thereof that when executed enable the controller, during a first condition, to engage the first clutch and disengage the second clutch when moving a vehicle comprising the transmission system from a standstill, wherein the instructions further cause the controller to only operate a first motor coupled to the first input shaft during the first condition.

9. The system of claim 8, wherein the instructions further cause the controller, during a second condition, to engage the second clutch and disengage the first clutch when the vehicle is moving at a threshold speed, wherein instructions further cause the controller to operate the first motor coupled to the first input shaft and a second motor coupled to the second input shaft during the second condition.

10. The system of claim 7, wherein the transmission system is a multi-speed transmission system.

11. The system of claim 7, wherein the output shaft is the only output of the transmission system.

12. The system of claim 7, wherein the pair of clutches are wet clutches.

13. The system of claim 7, wherein the first clutch gear is arranged on the output shaft.

14. The system of claim 7, wherein the second clutch comprises a second clutch gear arranged on a second clutch shaft, the second clutch shaft coupled directly to the planet shaft and the second clutch gear in a meshed coupling with the output shaft gear.

15. The system of claim 7, wherein only one of the first clutch and the second clutch is engaged when power is transferred to the output shaft.

16. A method for operating clutches of a two-speed transmission, comprising:

activating a first clutch of the two-speed transmission and flowing power from only a first motor to a planet shaft of a planetary gear set, to a planet gear, to a first clutch gear meshed with the planet gear, and to an output shaft on which the first clutch gear is arranged during a first operation; and activating a second clutch of the two-speed transmission and deactivating the first clutch during a second operation, further comprising flowing power from each of the first motor and a second motor to the planet shaft of the planetary gear set, to a second clutch shaft coupled to the planet shaft, to a second clutch gear arranged on the second clutch shaft, and to an output shaft gear arranged on the output shaft, wherein a second gear is meshed to the first clutch gear of the first clutch, and wherein the second gear is directly coupled to the second clutch.

17. The method of claim 16, wherein the first operation comprises actuating a vehicle comprising the two-speed transmission from a standstill.

18. The method of claim 16, wherein the second operation comprises actuating a vehicle comprising the two-speed transmission at a threshold speed.

19. The method of claim 16, wherein flowing power further comprises flowing power to a differential on an axle, wherein wheels are coupled to extreme ends of the axle.

20. The method of claim 16, wherein the first motor is an electric machine.

* * * * *